United States Patent
Hou et al.

(10) Patent No.: US 10,365,010 B2
(45) Date of Patent: Jul. 30, 2019

(54) WATER DRAINING STRUCTURE OF DEHUMIDIFIER AND DEHUMIDIFIER

(71) Applicant: Jiangsu Yoau Electric Co., Ltd., Changzhou, Jiangsu (CN)

(72) Inventors: Chengcai Hou, Jiangsu (CN); Jun Lu, Jiangsu (CN)

(73) Assignee: Jiangsu Yoau Electric Co., Ltd., Changzhou, Jiangsu (CN)

( * ) Notice: Subject to any disclaimer, the term of this patent is extended or adjusted under 35 U.S.C. 154(b) by 125 days.

(21) Appl. No.: 15/691,013

(22) Filed: Aug. 30, 2017

(65) Prior Publication Data
US 2018/0195758 A1    Jul. 12, 2018

(30) Foreign Application Priority Data

Jan. 11, 2017   (CN) .................. 2017 2 00311993 U

(51) Int. Cl.
| | | |
|---|---|---|
| *F24F 13/22* | (2006.01) | |
| *B01D 53/26* | (2006.01) | |
| *F25B 13/00* | (2006.01) | |
| *F25D 21/14* | (2006.01) | |
| *F24F 3/14* | (2006.01) | |

(Continued)

(52) U.S. Cl.
CPC .......... *F24F 13/222* (2013.01); *B01D 53/265* (2013.01); *F04B 17/03* (2013.01); *F04B 43/04* (2013.01); *F24F 3/14* (2013.01); *F25B 13/00* (2013.01); *F25D 21/14* (2013.01); *F28F 17/005* (2013.01); *F24F 2003/1446* (2013.01); *F24F 2013/227* (2013.01)

(58) Field of Classification Search
CPC ......... F24F 13/22; F24F 13/222; F04B 23/02; F04B 43/02; F04B 43/04
See application file for complete search history.

(56) References Cited

U.S. PATENT DOCUMENTS

| | | | |
|---|---|---|---|
| 6,370,902 B1 * | 4/2002 | De'Longhi ............ | B01D 5/009 62/288 |
| 6,817,194 B1 * | 11/2004 | Leach .................. | F24F 13/222 62/150 |

(Continued)

FOREIGN PATENT DOCUMENTS

| | | |
|---|---|---|
| CN | 202835729 U | 3/2013 |
| CN | 103574789 B | 5/2016 |
| JP | 55035140 * | 3/1980 |

*Primary Examiner* — Eric S Ruppert
(74) *Attorney, Agent, or Firm* — Novick, Kim & Lee, PLLC; Allen Xue

(57) ABSTRACT

A dehumidifier has a water receiving tray receiving condensed water of the dehumidifier. The water receiving tray comprises a water tank outlet, a main water outlet arranged outside the casing of the dehumidifier as a whole, the main water outlet being arranged opposite the water tank outlet; a pump used for draining is provided on the bottom of the outside of the water receiving tray, the pump being directly connected with the water receiving tray, eliminating the need of providing a pipe to connect with the dehumidifier pump, therefore reducing the risk of leaking. By connecting the pump with the water receiving tray directly, the pressure loss due to the connection of pipe is eliminated; the drainage capacity of the pump is utilized fully. Without installing or detaching additional pipes during installment or maintenance, operation is easier.

13 Claims, 4 Drawing Sheets

(51) Int. Cl.
*F04B 43/04* (2006.01)
*F04B 17/03* (2006.01)
*F28F 17/00* (2006.01)

(56) References Cited

U.S. PATENT DOCUMENTS

| | | | | |
|---|---|---|---|---|
| 2004/0161341 A1* | 8/2004 | Kalchthaler | ............... | E03B 5/00 |
| | | | | 417/40 |
| 2009/0071181 A1* | 3/2009 | Spanger | ................ | F24F 13/222 |
| | | | | 62/262 |
| 2014/0174289 A1* | 6/2014 | Tan et al. | ............. | B01D 53/265 |
| | | | | 95/14 |

* cited by examiner

WATER DRAINING STRUCTURE OF DEHUMIDIFIER AND DEHUMIDIFIER

TECHNICAL FIELD

The invention relates to the field of household appliances, particularly to a water draining mechanism of a dehumidifier and a dehumidifier containing such a mechanism.

BACKGROUND

At present, most of dehumidifiers with pump are equipped with AC electromagnetic pumps driven by commercial power. These dehumidifiers are mostly used in basements and need to be provided with a pipe as long as 10 meters or more. To meet the drainage lift of the pump, choosing the electromagnetic pump with high-voltage results in increase of power. As error or aging occur, the electromagnetic pump will be damaged or even catch fire due to heating up of the pump.

In CN201210274227.6, in order to solve the problem of pump catching fire, a dehumidifier provided with a pump inside uses a fireproof panel to control the risk of water leaking and catching fire. But in this application, the pump still needs to be connected with inlet pipes and outlet pipes, bringing increased risk of water leaking; the pipes are connected with the pump in a clamping manner, making it harder to operate and causing loose installation; installation space and gaps are reserved for a plurality of fireproof panels around the pump, much space are occupied; further, using fireproof panel can only prevent catching fire instead of being heated and self-igniting.

CN201220456834.X discloses a water draining device of a dehumidifier. A low noise, high lift, long service life, easy draining device of a dehumidifier is provided. The pump is arranged inside the water tank, it is dangerous because the pump is an electrical piece; further, the pump is installed by a frame, also requiring connecting with outlets and therefore increase the risk of water leaking; the structure thereof is rather complicated, making it inconvenient to operate during the maintenance; while using brushless DC pump can reduce noise, high-speed impellers are needed to drain water, noise caused by impaction on high-speed impellers of water is unavoidable

SUMMARY OF THE INVENTION

The invention is provided to solve the following problems: the pump in dehumidifier need to be connected to pipes to drain water, such a structure increases the risk of leaking, and the connection of pump and pipes increases the drainage pressure of pump, and the inconvenience of operation during the installation and maintenance of pump and pipes. The invention provides a water draining mechanism of a dehumidifier, comprising a water receiving tray receiving condensed water of the dehumidifier, the water receiving tray comprising a water tank outlet, a main water outlet arranged outside the casing of the dehumidifier as a whole, the main water outlet being arranged opposite the water tank outlet, and a pump used for draining is provided on the bottom of the outside of the water receiving tray, and the pump being directly connected with the water receiving tray, eliminating the need of providing a pipe to connect with the dehumidifier pump, such a structure therefore reduces the risk of leaking. By connecting the pump with the water receiving tray directly, the pressure loss due to the connection of pipe is eliminated; the drainage capacity of the pump is utilized fully. Without installing or detaching additional pipes during installment or maintenance, operation is easier.

To solve the technical problems, the technical solutions of the invention are:

A water draining mechanism of a dehumidifier, comprising a water receiving tray receiving condensed water of the dehumidifier, the water receiving tray comprising a water tank outlet, a main water outlet arranged outside the casing of the dehumidifier as a whole, the main water outlet being arranged opposite the water tank outlet, a pump used for draining being provided on the bottom of the outside of the water receiving tray, and the pump being directly connected with the water receiving tray.

Further, pump is a DC diaphragm type pump driven by a 3V-37V power source, preferably a 12V power source, and the pump (31) is mounted vertically at the bottom of the water receiving tray.

Arranging the pump vertically at the bottom of the water receiving tray has the following effects: (1) water in the water receiving tray can flow to the pump inlet directly, so the suction lift of the pump is eliminated and its impaction on the total lift is therefore reduced, and the maximum lift of the pump is ensured and the drainage capacity of the pump can be fully utilized, application of such products will ensure the maximum drainage height of the pump; (2) the vertical installation of pump can mitigate vibrating during the operation of pump; (3) the vertical installation can also facilitate screw fixation of line workers.

Further, the pump comprises a pump body, a pump inlet, and a pump outlet, and the pump inlet and the pump outlet are on the same end of the pump body.

Further, the water receiving tray is provided with a tray outlet connected directly with the pump inlet and a tray inlet connected directly with the pump outlet.

Further, an installation seat used for securing the pump is included, and the installation seat is fixed at the bottom of the water receiving tray by screw.

Further, sealing rings used for sealing are provided on the joint of the pump inlet and the tray outlet and the joint of the pump outlet and the tray inlet respectively; the sealing rings are made of rubber.

Further, a tray cover covering the water receiving tray is arranged above the water receiving tray; the tray cover is provided with a water level switch collecting and judging the water level inside the water receiving tray and controlling the drainage of the pump within the predefined water level.

Further, a filter screen is arranged between the the tray cover and the water receiving tray and at the inlet of condensed water, and meshes of the filter screen have a size less than 4 mm.

Further, the water tank outlet is provided with a removable plug inside.

Further, the plug is plugged in the water tank outlet.

A dehumidifier, comprising an evaporator, a condenser, an air supply system, a water tank, a compressor, a draining pipe, further comprises a water draining mechanism of a dehumidifier according to any one of above claims; the evaporator and the condenser are arranged above the water draining mechanism; the air supply system is arranged in front of the condenser; the water tank is arranged right below the air supply system and connected with the water tank outlet in the water draining mechanism; the draining pipe is arranged in a main water outlet Advantages of the invention are: the invention provides a water draining mechanism of a dehumidifier, comprising a water receiving tray receiving condensed water of the dehumidifier. The water receiving tray comprises a water tank outlet, a main water outlet arranged outside the casing of the dehumidifier as a whole, the main water outlet being arranged opposite the water tank outlet; a pump used for draining is provided on the bottom of the outside of the water receiving tray, the pump being directly connected with the water receiving tray, eliminating the need of providing a pipe to connect with the dehumidifier pump, therefore reducing the risk of leaking. By connecting the pump with the water receiving tray directly, the pressure loss due to the connection of pipe is eliminated, the drainage capacity of the pump is utilized fully. Without installing or detaching additional pipes during installment or maintenance, operation is easier.

The pump uses a low voltage DC diaphragm type pump driven by a power source of 12V, enabling the drainage lift over 10 meters without risking overheating; and the DC diaphragm type pump generates pressure difference and drain water by the reciprocating motion of the diaphragm inside, noise is very low; arranging the pump vertically at the bottom of the water receiving tray not only provide isolation of the pump from the water receiving tray, the water tank and other water receiving pieces, improving safety, but help mitigating vibration of the pump without providing specific damper. Rubber rings made of rubber are applied between the pump and the water receiving tray, therefore enhancing seal performance and security. Also, the installation is more solid by fixing the pump on the bottom of the outside of the water receiving tray by screws.

BRIEF DESCRIPTION OF THE DRAWINGS

Further details of the present invention emerge from the embodiments described below and from the drawings, in which.

Figure 1:
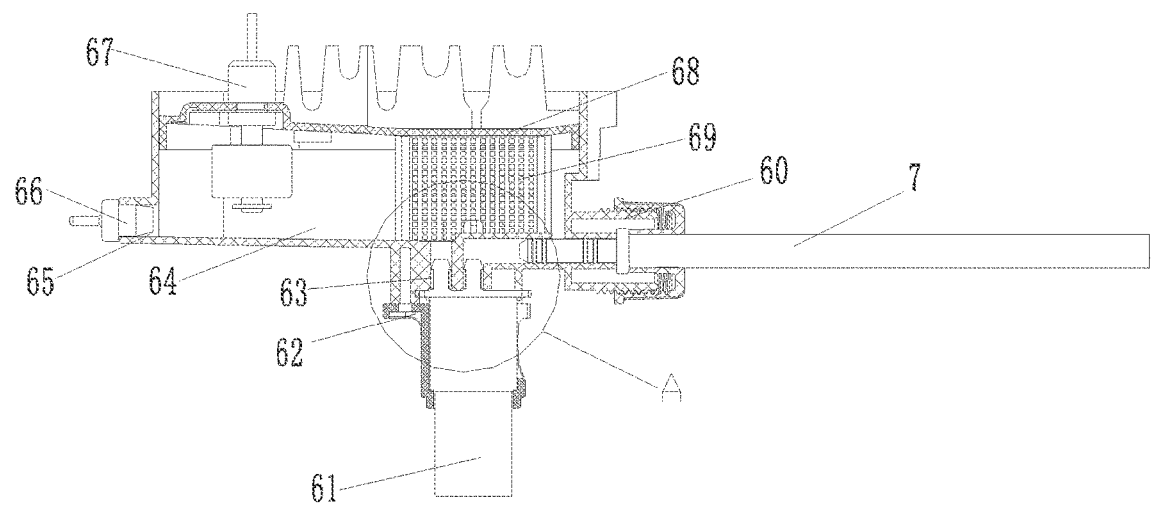
FIG. 1 is a schematic view of the water draining mechanism of the dehumidifier according to the present invention.
Figure 2:
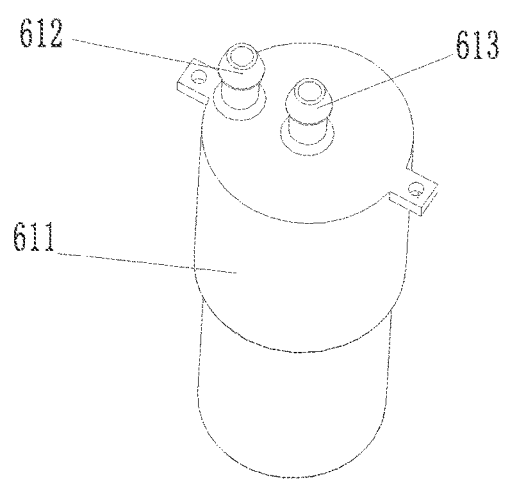
FIG. 2 is a schematic view of the pump.
Figure 3:
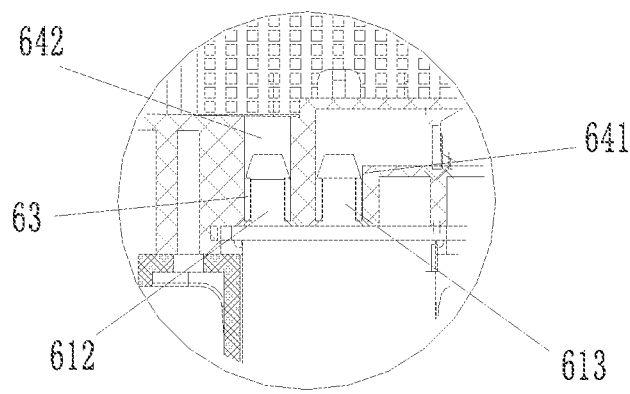
FIG. 3 is an enlarged view of "A" in FIG. 1.
Figure 4:
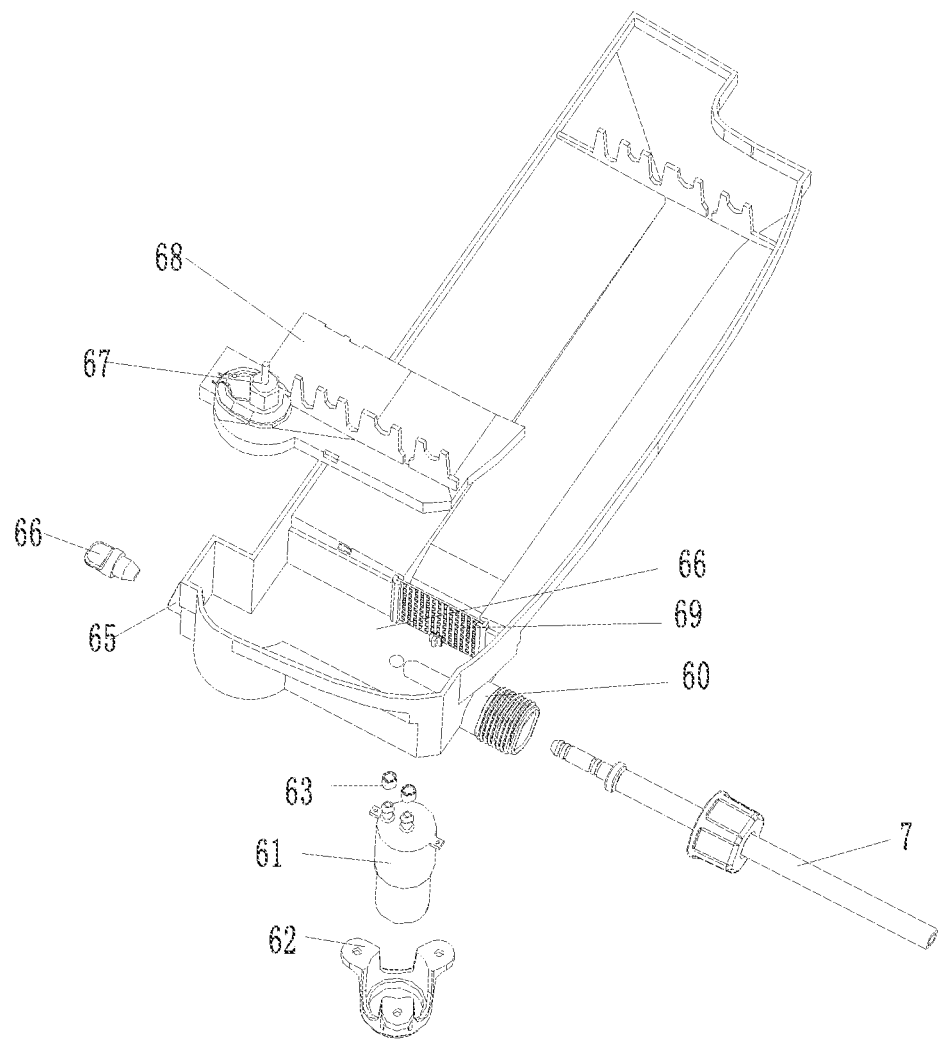
FIG. 4 is an exploded view of the water draining mechanism.
Figure 5:
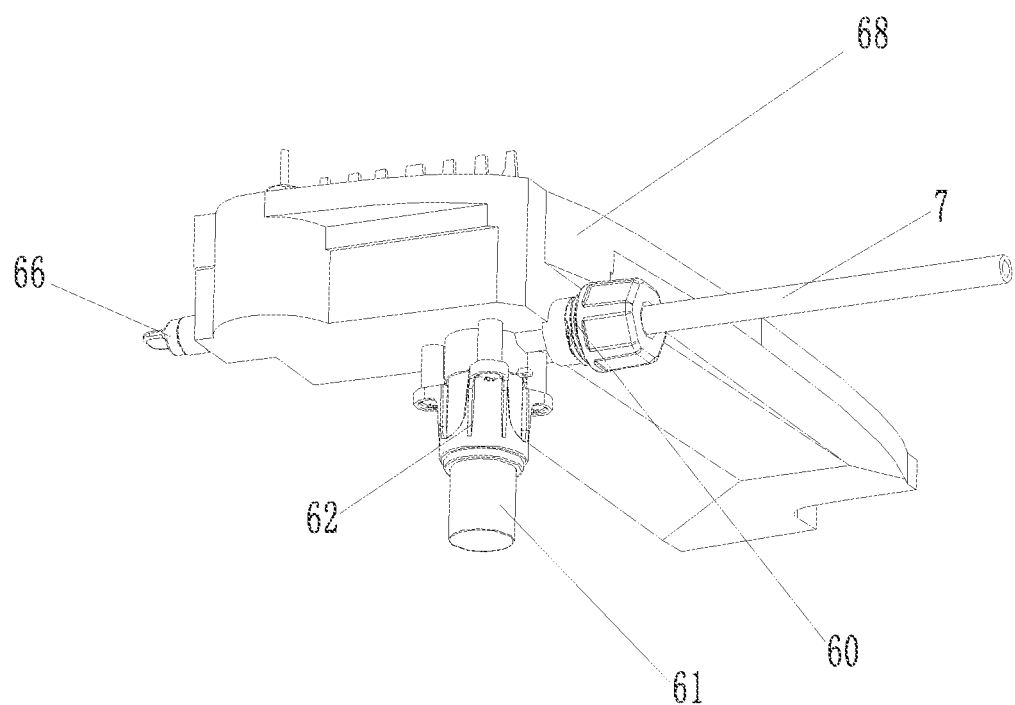
FIG. 5 is a schematic of the installation of the pump.
Figure 6:
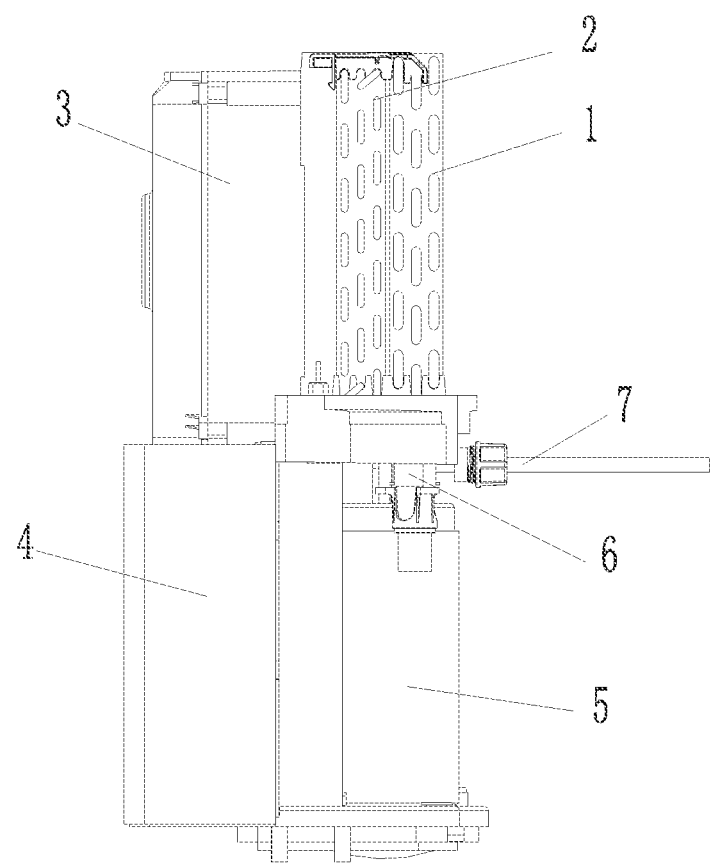
FIG. 6 is a schematic of the dehumidifier.

In drawings: 1. evaporator; 2. condenser; 3. air supply system; 4. water tank; 5. compressor; 6. water draining mechanism; 7. draining pipe; 60. main water outlet; 61. pump; 62: installation seat; 63. sealing ring; 64: water receiving tray; 65. water tank outlet; 66. plug; 67. water level switch; 68. tray cover; 69. filter screen; 611. pump body; 612. pump inlet; 613. pump outlet; 641. tray inlet; 642. tray outlet.

DESCRIPTION OF THE PREFERRED EMBODIMENTS

Reference will now be made in detail to the present disclosure, which are illustrated in the accompanying drawings. These drawings are simplified schematic drawings. To illustrate the basic structure of the present invention, the drawings only show elements relating to the present disclosure.

Example 1

A water draining mechanism of a dehumidifier, comprises a water receiving tray 64 receiving condensed water of the dehumidifier, the water receiving tray 64 comprising a water tank outlet 65, a main water outlet 60 arranged outside the casing of the dehumidifier as a whole, the main water outlet 60 being arranged opposite the water tank outlet 65; a pump 61 used for draining is provided on the bottom of the outside of the water receiving tray 64, and the pump 61 is directly connected with the water receiving tray 64. The pump 31 is a DC diaphragm type pump driven by a 12V power source, and the pump 31 is mounted vertically at the bottom of the water receiving tray 64.

The pump 31 comprises a pump body 611, a pump inlet 612, and a pump outlet 613, and the pump inlet 612 and the pump outlet 613 are on the same end of the pump body 611, the water receiving tray 64 is provided with a tray outlet 642 connected directly with the pump inlet 612 and a tray inlet 641 connected directly with the pump outlet 613.

Example 2

Like Example 1, further, an installation seat 62 used for securing the pump 31 is included, and the installation seat 62 is fixed at the bottom of the water receiving tray 64 by screw. Sealing rings 63 used for sealing are provided on the joint of the pump inlet 612 and the tray outlet 642 and the joint of the pump outlet 613 and the tray inlet 641 respectively; the sealing rings 63 are made of rubber, and a tray cover 68 covering the water receiving tray 64 is arranged above the water receiving tray 64; the tray cover 68 is provided with a water level switch 67 collecting and judging the water level inside the water receiving tray 64 and controlling the drainage of the pump 61 within the predefined water level, and a filter screen 69 is arranged between the tray cover 68 and the water receiving tray 64 and at the inlet of condensed water, and meshes of the filter screen 69 have a size less than 4 mm preferably, and the water tank outlet 65 is provided with a removable plug 66 inside, and the plug 66 is plugged in the water tank outlet 65.

A dehumidifier, comprising a evaporator 1, a condenser 2, an air supply system 3, a water tank 4, a compressor 5, a draining pipe 7, further comprises a water draining mechanism of a dehumidifier mentioned above; the evaporator 1 and the condenser 2 are arranged above the water draining mechanism; the air supply system 3 is arranged in front of the condenser 2; the water tank 4 is arranged right below the air supply system 3 and connected with the water tank outlet 65 in the water draining mechanism; the draining pipe 7 is arranged in a main water outlet 60.

A few embodiments have been shown based on the present invention ideally. It would be appreciated by those skilled in the art that various changes and modifications may be made without departing from the principles and spirit of the invention, the scope of which is not limited by the description, but defined in the claims.

The invention claimed is:

1. A water draining device of a dehumidifier, comprising a water receiving tray for receiving condensed water from the dehumidifier, the water receiving tray comprises a first water outlet, a main water outlet arranged outside the casing of the dehumidifier as a whole, the main water outlet being arranged opposite to the first water outlet;

a pump provided on the bottom of the outside of the water receiving tray, and directly connected with the water receiving tray, wherein said pump is a DC diaphragm type pump driven by a 3V-37V power source, wherein the pump comprises a pump body, a pump inlet, and a pump outlet, and the pump inlet and the pump outlet are on a same end of the pump body, and wherein the water receiving tray is provided with a tray outlet connected directly with the pump inlet and a tray inlet connected directly with the pump outlet.

2. The water draining device according to claim 1, further comprising an installation seat for securing the pump, and the installation seat is affixed at the bottom of the water receiving tray.

3. The water draining device according to claim 2, further comprising a first sealing ring disposed on a joint of the pump inlet and the tray outlet; and a second sealing ring disposed on a joint of the pump outlet and the tray inlet.

4. The water draining device according to claim 3, further comprising a tray cover covering the water receiving tray, wherein the tray cover is provided with a water level switch for measuring a water level inside the water receiving tray and controlling the pump.

5. The water draining device according to claim 4, further comprising a filter screen arranged between the tray cover and the water receiving tray and having a mesh size of less than 4 mm.

6. The water draining device according to claim 5, wherein the first water tank outlet is provided with a removable plug.

7. The water draining device according to claim 6, wherein the plug is plugged in the first water outlet.

8. A dehumidifier, comprising an evaporator, a condenser, an air inlet, a water tank, a compressor, a draining pipe, and a water draining device of claim 1; the evaporator and the condenser are arranged above the water draining device; the air inlet is arranged in front of the condenser; the water tank is arranged right below the air inlet and connected with the first water outlet in the water draining device; the draining pipe is arranged in the main water outlet.

9. The dehumidifier of claim 8, wherein the water draining device comprises a first sealing ring disposed on the joint of the pump inlet and the tray outlet; and a second sealing ring disposed on the joint of the pump outlet.

10. The dehumidifier of claim 9, wherein the water draining device further comprises a tray cover covering the water receiving tray, wherein the tray cover is provided with a water level switch for measuring a water level inside the water receiving tray and controlling the pump.

11. The dehumidifier of claim 10, wherein the water draining device further comprises a filter screen arranged between the tray cover and the water receiving tray and having a mesh size of less than 4 mm.

12. The dehumidifier of claim 11, wherein the first water outlet in the water draining device is provided with a removable plug.

13. The dehumidifier of claim 12, wherein the plug is plugged in the first water outlet.

* * * * *